(12) United States Patent
Stern et al.

(10) Patent No.: US 10,002,361 B2
(45) Date of Patent: Jun. 19, 2018

(54) REMOTE SUPERVISION OF CLIENT DEVICE ACTIVITY

(71) Applicant: Esquify, Inc., Chicago, IL (US)

(72) Inventors: Drew A. Stern, Chicago, IL (US); Rongkai Zhao, Chicago, IL (US); Scott Y. Stuart, Chicago, IL (US); Christian Auty, Chicago, IL (US)

(73) Assignee: Esquify, Inc., Chicago, IL (US)

( * ) Notice: Subject to any disclaimer, the term of this patent is extended or adjusted under 35 U.S.C. 154(b) by 652 days.

(21) Appl. No.: 14/633,607

(22) Filed: Feb. 27, 2015

(65) Prior Publication Data

US 2016/0328718 A1    Nov. 10, 2016

(51) Int. Cl.
*G06F 15/173*    (2006.01)
*G06Q 30/00*    (2012.01)
(Continued)

(52) U.S. Cl.
CPC ..... *G06Q 30/0185* (2013.01); *G06F 11/3423* (2013.01); *G06F 11/3438* (2013.01); (Continued)

(58) Field of Classification Search
CPC .... G06F 3/0325; G06F 3/0304; G06F 3/1454; G06F 3/04815; G06F 3/033; G06F 3/048; G06F 3/04842; G06F 3/1462; G06F 17/30572; G06F 11/3438; G06F 21/55; G06F 21/577; G06F 2221/2101; G06F 2221/2139; G06K 2009/3225; G06K 2209/01; G06K 9/72; G06K 9/325; G06K 9/6227; G06K 9/723; H04N 7/181; H04N 1/00307; H04N 1/00411; H04N 21/442
See application file for complete search history.

(56) References Cited

U.S. PATENT DOCUMENTS 6,573,915 B1    6/2003    Sivan et al.
6,745,367 B1    6/2004    Bates et al.
(Continued)

OTHER PUBLICATIONS

International Searching Authority, International Search Report and Written Opinion dated Apr. 11, 2016, issued in connection with International Patent Application No. PCT/US2016/016109, 13 pages.

*Primary Examiner* — Chirag R Patel
*Assistant Examiner* — Rachel J Hackenberg
(74) *Attorney, Agent, or Firm* — McDonnell Boehnen Hulbert & Berghoff LLP

(57) ABSTRACT

A server device may receive a series of at least two screen capture representations of a graphical user interface on a client device. A first active window for a first screen capture representation of the series and a second active window for a second screen capture representation of the series may be determined. The first screen capture representation may have been screen captured by the client device at a first time and the second screen capture representation may have been screen captured by the client device at a second time. A first application associated with the first active window and a second application associated with the second active window may be identified, at least one of which may be a pre-determined target application. Based on the identified applications, an activity log for the client device may be determined.

20 Claims, 9 Drawing Sheets

(51) Int. Cl.
*G06Q 30/04* (2012.01)
*H04L 29/08* (2006.01)
*G06F 11/34* (2006.01)

(52) U.S. Cl.
CPC ............ *G06Q 30/04* (2013.01); *H04L 67/22* (2013.01); *G06F 11/3476* (2013.01)

(56) References Cited

U.S. PATENT DOCUMENTS

| | | | |
|---|---|---|---|
| 7,502,797 B2* | 3/2009 | Schran | G06F 11/34 |
| 8,165,974 B2 | 4/2012 | Privault et al. | |
| 8,437,460 B2 | 5/2013 | Daniell et al. | |
| 8,671,187 B1 | 3/2014 | Fu et al. | |
| 8,726,075 B1 | 5/2014 | Lerner | |
| 2002/0174134 A1 | 11/2002 | Goykhman | |
| 2007/0211147 A1* | 9/2007 | Tseng | G06F 3/0481 348/207.1 |
| 2009/0204471 A1 | 8/2009 | Elenbaas et al. | |
| 2010/0318971 A1* | 12/2010 | Nagle | G06F 11/3672 717/125 |
| 2013/0246969 A1 | 9/2013 | Barton | |
| 2013/0311653 A1* | 11/2013 | Hernandez | H04L 67/22 709/224 |
| 2014/0032735 A1 | 1/2014 | Kapoor | |
| 2014/0058801 A1 | 2/2014 | Deodhar et al. | |
| 2016/0019530 A1* | 1/2016 | Wang | G06K 9/00442 705/39 |
| 2016/0088103 A1* | 3/2016 | Sharma | H04L 67/22 709/204 |

\* cited by examiner

REMOTE SUPERVISION OF CLIENT DEVICE ACTIVITY

BACKGROUND

As workforces become more dispersed and outsourced, computer-mediated tasks are more frequently distributed to users of remote client devices. These remote users may not work in a normal business setting or during normal business hours, and may be compensated based on the amount of time that they work, as well as certain task-level goals. Unlike in traditional business settings, supervising remote users is challenging and many current arrangements require that the remote users self-report their billable work. Consequently, these users are provided with opportunities to overbill or commit other types of fraud.

SUMMARY

Since remote users typically perform their tasks, at least partially, on a computing device (e.g., a personal computer, tablet computer, wireless computing device, etc.), it may be beneficial for that device to operate software that remotely supervises the activities of these users. In doing so, the remote supervision software may be able to identify how much time a particular user spends on billable tasks, how long the user spends on non-billable tasks, and when the user is idle. The remote supervision software may also be able to output an activity log of the user's activity, summarizing the user's activity, progress toward certain goals, and/or earnings.

One way to remotely supervise a user's client device is to have the client device perform periodic screen captures. Each screen capture may include a graphical representation of the client device's screen at the time of the capture, and may be transmitted to a server device. At the server device, these screen captures may be processed, either in real time or at a later point, to determine the application that the user was interacting with at the time of the capture, whether the application was a pre-determined target application that the user has been instructed to operate, and/or what type of progress the user has made toward his or her goals. Alternatively, at least some of the processing of screen captures may occur on the client device. From the processed series of screen captures, the activity log may be derived, which may in turn be used as a basis of compensating the user.

Accordingly, a first example embodiment may involve a server device receiving a series of at least two screen capture representations of a graphical user interface on a client device. The first example embodiment may also involve determining a first active window for a first screen capture representation of the series and a second active window for a second screen capture representation of the series. The first screen capture representation may have been screen captured by the client device at a first time and the second screen capture representation may have been screen captured by the client device at a second time. The first example embodiment may further involve identifying a first application associated with the first active window and a second application associated with the second active window, wherein the first application was executing in the first active window at the first time and the second application was executing in the second active window at the second time. At least one of the first application or the second application may be a pre-determined target application. The first example embodiment may additionally involve, possibly based on the first application executing at the first time and the second application executing at the second time, determining an activity log for the client device. The activity log may identify one or more idle periods and one or more busy periods for the pre-determined target application.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, a computing device may include at least one processor, as well as data storage and program instructions. The program instructions may be stored in the data storage, and upon execution by the at least one processor may cause the computing device to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
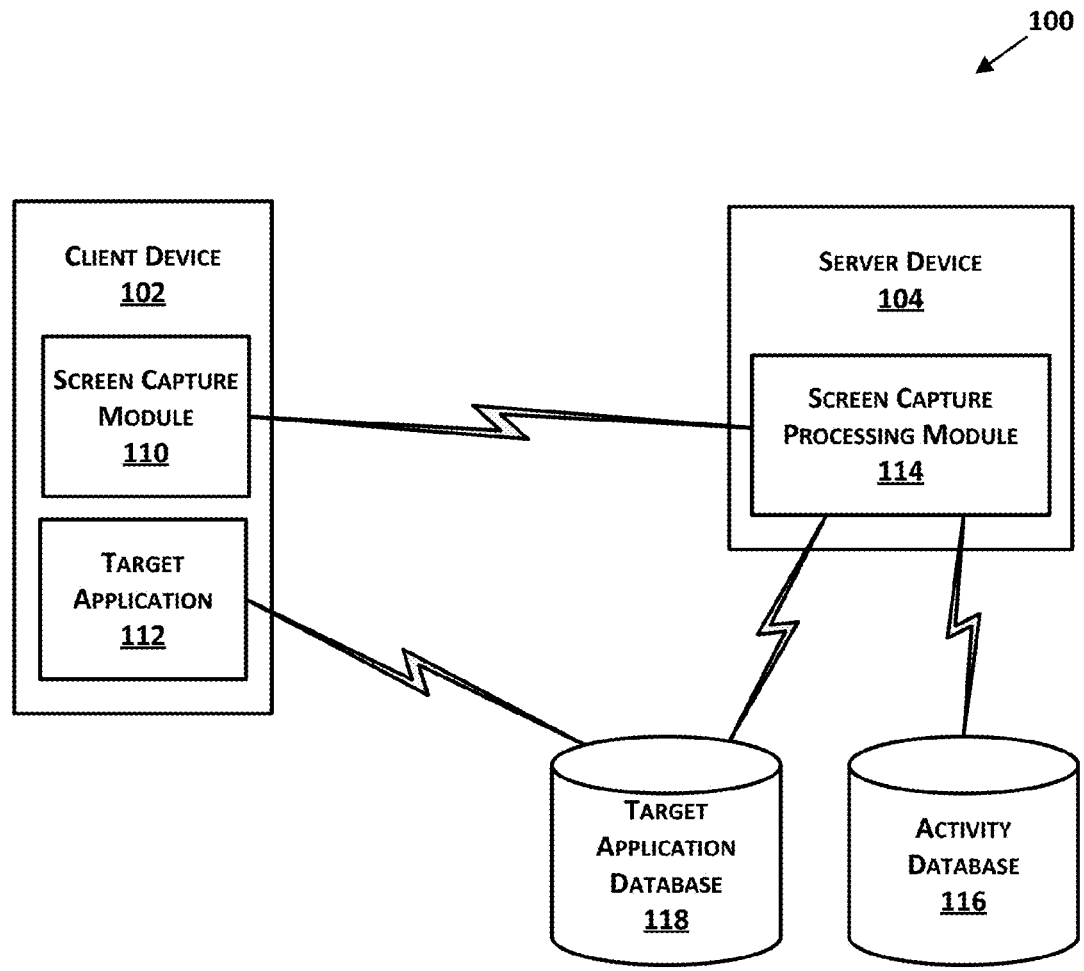
FIG. 1 depicts a client/server networked environment, according to example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

1. Overview

As noted above, remote supervision of client devices and their associated users may be desirable in settings where these remote users are performing tasks using a client device. As an illustration, throughout this specification the example of legal document review is used. However, the procedures, operations, devices and systems described herein may be used with other types of tasks. These additional tasks may include, but are not limited to, data entry, proofreading, medical coding, and so on. Any computer-mediated task that can be distributed to a remote workforce is a candidate for the remote supervision embodiments described herein.

Legal document review is a particularly compelling type of task for remote supervision. In U.S. lawsuits, document review is the process in which each party in the lawsuit sorts, analyzes, and categorizes the documents and data they possess, as well as the documents and data supplied by the other parties. A primary goal of such review is to determine which documents are sensitive and/or otherwise relevant to the case. For instance, before providing collected documents to an opposing party, a litigant may review each of these documents to determine whether they are protected by privilege (e.g., attorney/client privilege) and/or relevant to the issues under dispute (e.g., responsive to a discovery request from another party). Documents that are not privileged, but are relevant, may be produced to the opposing party, but the remaining documents typically are not.

Document review is almost exclusively electronic. Most document review software environments use a native application that executes on the reviewers' computers, or are web-based. Through this software, the reviewers may view documents, and tag them according to various criteria (e.g., privilege and/or relevance).

In some lawsuits, tens or hundreds of thousands of documents may be reviewed. Often, the reviewers are junior attorneys, contract attorneys, paralegals, or outsourced document reviewers. These reviewers may be situated in law offices, remote offices, home offices, or even overseas. Given the volume of documents that may be reviewed even for a relatively small lawsuit, document review can be one of the most costly aspects of litigation. Thus, efforts are often made to reduce the cost associated with these tasks.

For instance, outsourced document reviewers may charge for 8 hours of work per day per reviewer. However, it is difficult to quantify whether each reviewer indeed spent an entire 8 hours per day reviewing documents. Some reviewers may have multiple windows open on their client device's user interface, reviewing documents in one window and performing other tasks in the remaining windows. Some of these other tasks may be non-billable and/or non-work-related, such as checking email, playing games, or viewing social networking sites. Further, some reviewers may keep the document review application window open, but might not be actually reviewing documents with 100% of their time. For example, these reviewers may be talking to coworkers, or using their mobile devices.

As such, it is beneficial to be able to remotely supervise document reviewers. Manual supervision of these individuals is too time consuming, error prone, and costly. Instead, since the vast majority of document reviewers use software tools to perform their reviews on computing devices, remote supervision software can be installed on these devices. Particularly, and as noted above, a remotely supervised client device may be instructed by this software to periodically perform screen captures. Each screen capture may include a graphical representation of the client device's screen at the time of the capture, and may be transmitted to a server device. At the server device, these screen captures may be processed, either in real time or at a later point, to determine the application that the user was interacting with at the time of the capture, and whether the application was the document review application. Alternatively, at least some of the processing of screen captures may occur on the client device. For instance, the client device may compress or perform other operations on some of the screen captures before transmitting them to the server device.

From the processed series of screen captures, an activity log may be derived, which may include indications of the reviewer's busy and idle periods. For instance, a busy period may begin when the reviewer makes the document review application the active window on the graphical user interface, and the busy period may end when a different application is made the active window, or the review application has been unused for a pre-determined period of time. The end of a busy period may also be the beginning of an idle period, and such an idle period may continue until the reviewer makes the document review application the active window once again, or the reviewer begins using the review application once again.

A window may be considered to be "active" when the graphical user interface is focused on the window such that any one or more of the following conditions is true: (i) the active window is layered on top of all other windows on the graphical user interface, (ii) the active window is distinguished from all other windows on the graphical user interface such as having different colors or brightnesses, or (iii) all keyboard, mouse, keypad or touchscreen interactions take place with the active window.

Regardless, the busy period and idle period information may be stored for billing and auditing purposes. Reviewers may be compensated based on their total busy time rather than their total time at a client device. Thus, a reviewer who uses a client device for 8 hours, but is idle for 1.7 of these hours, is only compensated for 6.3 hours of billable work. Also, by storing representations of at least some of the screen captures, the reviewer's activity can be audited in situations where the reviewer believes that he or she should be compensated for more billable work than recorded by the system.

The supervision and processing of screen capture representations is impractical, if not impossible, to perform manually. In order to effectively detect idle periods on client devices, each client device may perform screen captures once every second or once every few seconds. Further, in large litigations, there may be dozens of reviewers conducting document reviews for weeks on end. It would not be practical, cost effective, or reliable for a human to review all of the resulting screen capture representations in order to determine whether these reviewers are busy or idle at various times. Thus, automated processing of these screen capture representations is necessary to achieve speed and efficiency.

The embodiments herein provide example procedures, computing devices, and systems for remote supervision of client device activity. The next section describes illustrative examples of such systems and devices.

2. Example Systems and Devices

FIG. 1 illustrates an example communication system 100 for carrying out one or more of the embodiments described herein. Communication system 100 may include computing devices. Herein, a "computing device" may refer to either a client device (e.g., a personal computer, tablet computer, wireless computing device, etc.), a server device (e.g., a standalone server or a networked cluster of server equipment), or some other type of computational platform.

Client device 102 may be any type of client device that is configured to exchange transmitted data with a server device 104 in accordance with the embodiments described herein. For example, in FIG. 1, client device 102 may communicate with server device 104 via one or more wired or wireless interfaces. In some cases, client device 102 and server device 104 may communicate with one another via a local-area network. Alternatively, client device 102 and server device 104 may each reside within a different network, and may communicate via a wide-area network, such as the Internet.

Client device 102 may include a user interface, a communication interface, a processor, and data storage (e.g., memory). Among other things, the data storage may contain instructions executable by the processor for carrying out one or more operations relating to the data sent to, or received from, server device 104. The user interface of client device 102 may include buttons, a touchscreen, a microphone, and/or any other elements for receiving inputs, as well as a speaker, one or more display screens, and/or any other elements for communicating outputs.

While client device 102 may execute various types of applications, only two such applications are shown in FIG. 1. Screen capture module 110 is an application executing on client device 102 that performs screen captures. Target application 112 also executes on client device 102, and is the application for which the user of client device 102 is being supervised. For example, target application 112 may be a document review application. As such, target application 112 may operate in conjunction with target application database 118. For example, target application 112 may receive copies of documents from target application database 118, and may transmit the results of the review of these documents to target application database 118.

Server device 104 may be any entity or computing device arranged to carry out the server operations described herein. Like client device 102, server device 104 may include a user interface, a communication interface, a processor, and data storage. The data storage may contain instructions executable by the processor for carrying out one or more operations related to remotely supervising client device 102.

Server device 104 also executes screen capture processing module 114. This module may authenticate a user who logs in to screen capture module 110 on client device 102, and may also receive screen capture representations from client device 102. These screen capture representations, and/or the results of processing the screen capture representations, may be stored in activity database 116. Either in real time or at a later point, server device 104 (or some other computing device) may develop, from the information in activity database 116, an activity log for the reviewer using client device 102.

Additionally, screen capture processing module 114 may be in communication with target application database 118. This communication may facilitate improving the accuracy of the busy and idle period determination of client device 102, and/or reporting information regarding these idle and busy periods. For example, screen capture processing module 114, or some other application, may be able to correlate busy periods with documents reviewed during those busy periods and present this information in an integrated fashion.

While FIG. 1 depicts only one client device in communication with server device 104, multiple client devices (e.g., tens, hundreds, or thousands) may be simultaneously supervised by server device 104. Further, in some embodiments, server device 104 may scale in size to one or more clusters of servers in order to handle the processing and/or storage requirements of supervising many client devices.

Figure 2:
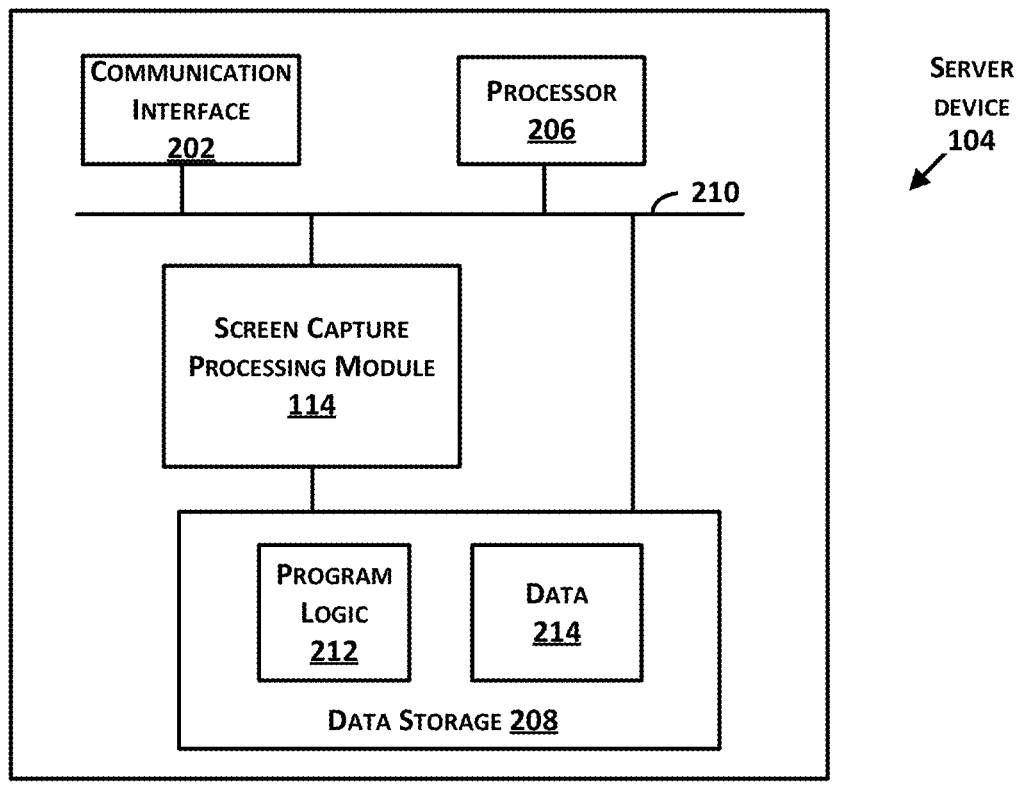
FIG. 2 is a schematic drawing of a server device, according to example embodiments.

FIG. 2 illustrates a schematic drawing of server device 104. In some examples, components illustrated in FIG. 2 may be distributed across multiple server devices. Nonetheless, for illustrative purposes, components are shown and described in FIG. 2 as part of server device 104.

In some implementations, server device 104 may include a device platform or operating system (not shown). The device platform may include different applications and an application framework, as well as various kernels, schedulers, memory managers, libraries, and runtime entities. In some examples, other formats or systems may operate on server device 104 as well.

Server device 104 may include a communication interface 202, a screen capture processing module 114, a processor 206, and data storage 208. Components illustrated in FIG. 2 may be linked together by a communication bus 210. Server device 104 may also include additional hardware to enable further functionality and/or operations.

Communication interface 202 may be configured to facilitate wired or wireless data communication according to one or more wired or wireless communication standards or non-standard protocols. For example, communication interface 202 may include an Ethernet interface or a Wifi interface. Other examples are also possible.

Data storage 208 may store program logic 212 that can be accessed and executed by processor 206. Program logic 212 may include machine-readable instructions that, when executed by processor 206, cause server device 104 to carry out various operations and procedures. Data storage 208 may also store data 214 that may include data received via communication interface 202. Data storage 208 may store additional data as well. Data storage 208 may be a non-transitory computer-readable data medium, such as a hardware memory module.

Processor 206 may be any type of one or more microprocessors or general-purpose processors. However, processor 206 may be integrated with or include various types of co-processors, network processors, graphics processors, and/or digital logic.

Communication bus 210 is illustrated as a wired connection; however, wireless connections may also be used. For example, communication bus 210 may be a wired serial bus, such as a universal serial bus (USB), or a parallel bus. Alternatively or additionally, communication bus 210 may be a wireless connection using, e.g., short-range wireless radio technology, communication protocols described in IEEE 802.11 (including any IEEE 802.11 revisions), or cellular technology, among other possibilities.

3. Example Message Flow Diagrams

Figure 3A:
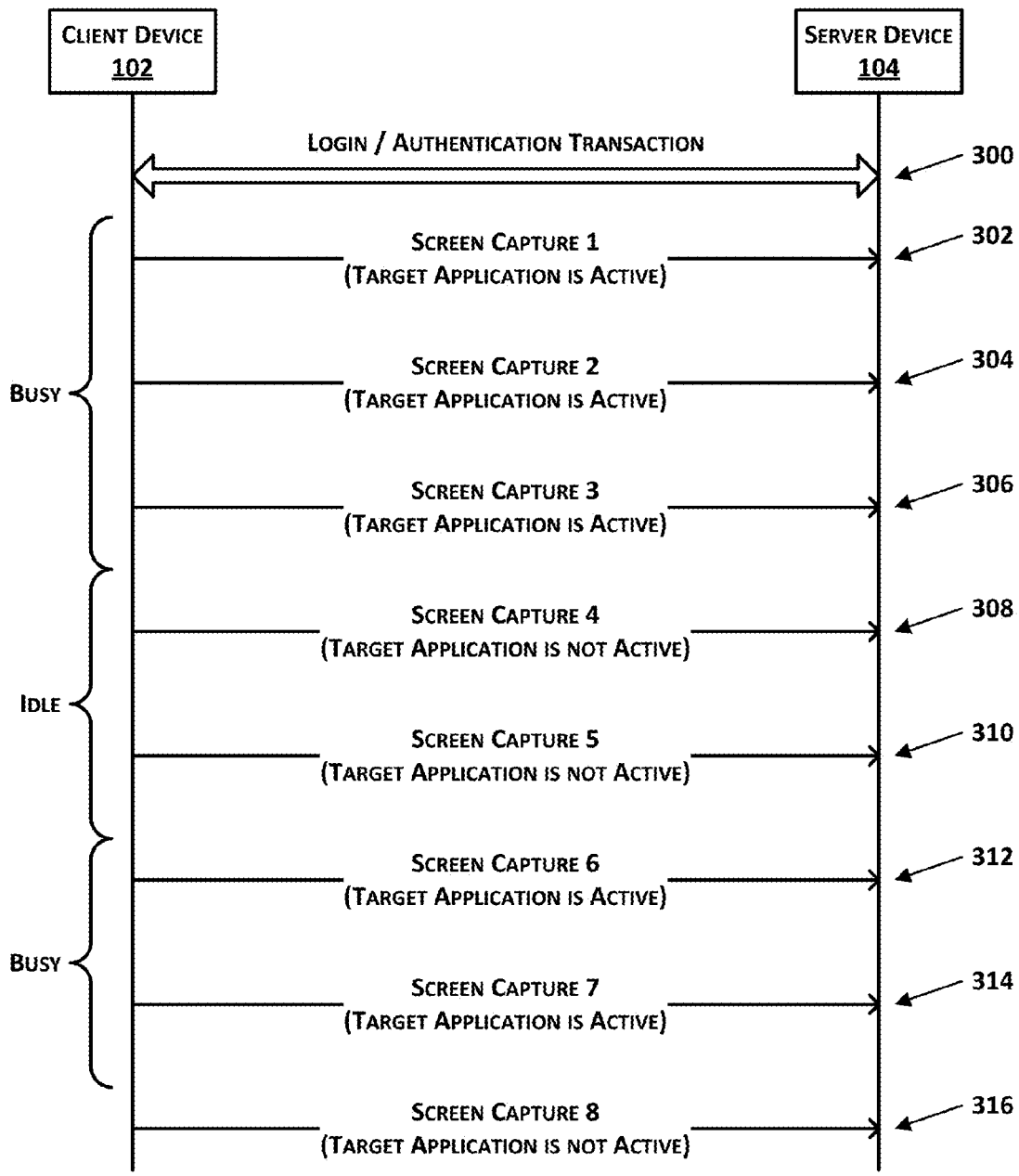
FIG. 3A is a message flow diagram, according to example embodiments.
Figure 3B:
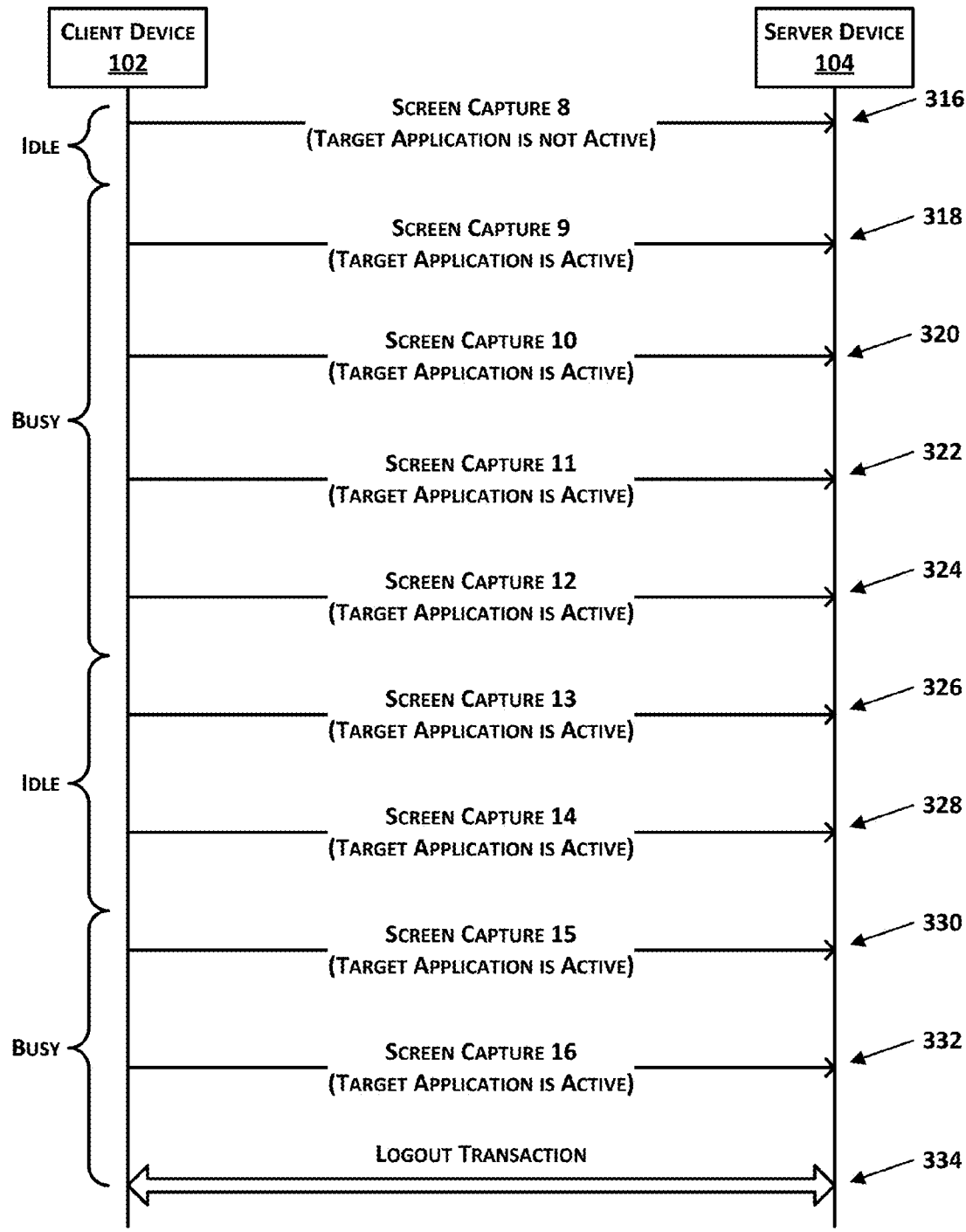
FIG. 3B is another message flow diagram, according to example embodiments.

FIGS. 3A and 3B illustrate an example message flow diagram of communication between client device 102 and server device 104. In this example, server device 104 remotely supervises client device 102.

At step 300, client device 102 performs a login and/or authentication transaction with server device 104. As an example, the user of client device 102 may provide a userid and password, and/or other credentials, to server device 104. Server device 104 may determine whether it has access to an account associated with this userid, and if so, may determine whether the provided password matches that of the account. Assuming that this is the case, server device 104 may transmit an indication to client device 102 that the user has successfully logged in to the account.

To carry out the login and/or authentication transaction of block 300, the user of client device 102 may use a native application (e.g., an application specifically compiled for the operating system of client device 102). Alternatively, the user may log in via a web browser.

Regardless, the transaction of step 300 begins the supervision of client device 102. As part of this supervision, server device 104 may provide certain supervision parameters to client device 102. For instance, server device 104 may instruct client device 102 to perform screen captures every n seconds, where n could be 1, 5, 10, and so on. In some situations, n may be less than 1. In some cases, a user of the client device may be associated with a reliability factor, and the frequency at which the client device performs the screen captures may be inversely proportional to the reliability factor. For instance, when a user is more reliable (e.g., less idle time is recorded for the user), the frequency may be decreased, but when a user is less reliable (e.g., more idle time is recorded for the user) the frequency may be increased.

At each of steps 302 through 332, client device 102 may perform a screen capture of the graphical user interface of client device 102, and may transmit a screen capture representation of this graphical user interface to server device 104. If a window is active on the graphical user interface at the time of such a screen capture, the screen capture representation may contain an image of the active window.

For example, at steps 302, 304, and 306, the user of client device 102 was busy using the target application (e.g., a document review application or any other application being supervised). So, client device 102 transmits screen capture representations 1, 2, and 3, respectively, in which the target application is the active window.

It should be noted that the screen capture representations might not explicitly indicate the active window on client device 102. Instead, client device 102 may capture images of its screen to respective graphics files, and transmit copies of these graphics files to server device 104. Server device 104 may process these graphics files, in real time or at a later point, to determine the active window in each.

At steps 308 and 310, the user of client device 102 was idle (e.g., using a non-target application). Accordingly, client device 102 transmits screen capture representations 4 and 5, in which the target application is not the active window (e.g., any application other than the target application may be the active window, or there may be no active window).

In some implementations, the target application may include an "idle" or "pause" control (e.g., a user interface button). When activated by the user, this control may cause the target application to start reporting that it is idle and/or to display a particular message on the screen (e.g., "idle" or "paused"). When the user begins using the target application again, the target application may report that it is busy, and the particular message may be removed from the screen. In some embodiments, when this control is activated, it may not count against the user's reliability factor, because the user is voluntarily admitting that he or she is not working.

At steps 312 and 314, the user of client device 102 was busy using the target application once again. Thus, client device 102 transmits screen capture representations 6 and 7, in which the target application is the active window.

Turning to FIG. 3B, at block 316, the user of client device 102 was idle. Consequently, client device 102 transmits screen capture representation 8, in which the target application is not the active window.

At steps 318, 320, 322, and 324, the user of client device 102 was busy using the target application. Hence, client device 102 transmits screen capture representations 9, 10, 11, and 12, in which the target application is the active window.

At steps 326 and 328, the user of client device 102 was idle. However, client device 102 transmits screen capture representations 13 and 14, in which the target application is active. A possible explanation for this discrepancy is that the user may have kept the target application window open and active, but might not have been interacting with the target application this whole time. The user may have moved away from his or her desk, been talking to coworkers or friends, or using his or her smartphone. In order to accurately measure the amount of time that the user has been busy and idle, it is desirable for server device 104 to be able to account for these idle periods in which the target application is the active window.

At steps 330 and 332, the user of client device 102 was busy using the target application. So, client device 102 transmits screen capture representations 15 and 16, in which the target application is the active window.

At block 334, client device 102 performs a logout transaction with server device 104. Thus, the user of client device 102 indicates that he or she is done using the target application for the moment, and server device 104 ends the supervision of client device 102 (e.g., client device 102 does not transmit further screen capture representations until a user once again logs in to server device 104).

Having received the 16 screen capture representations of FIGS. 3A and 3B, it is desirable for server device 104 to be able to determine the periods of time in which the user of client device 102 was idle and busy. To do so, server 104 may analyze the received screen capture representations and/or records from target application database 118. This analysis is discussed in the next section.

4. Identifying Busy and Idle Periods from Screen Capture Representations

Figure 4:
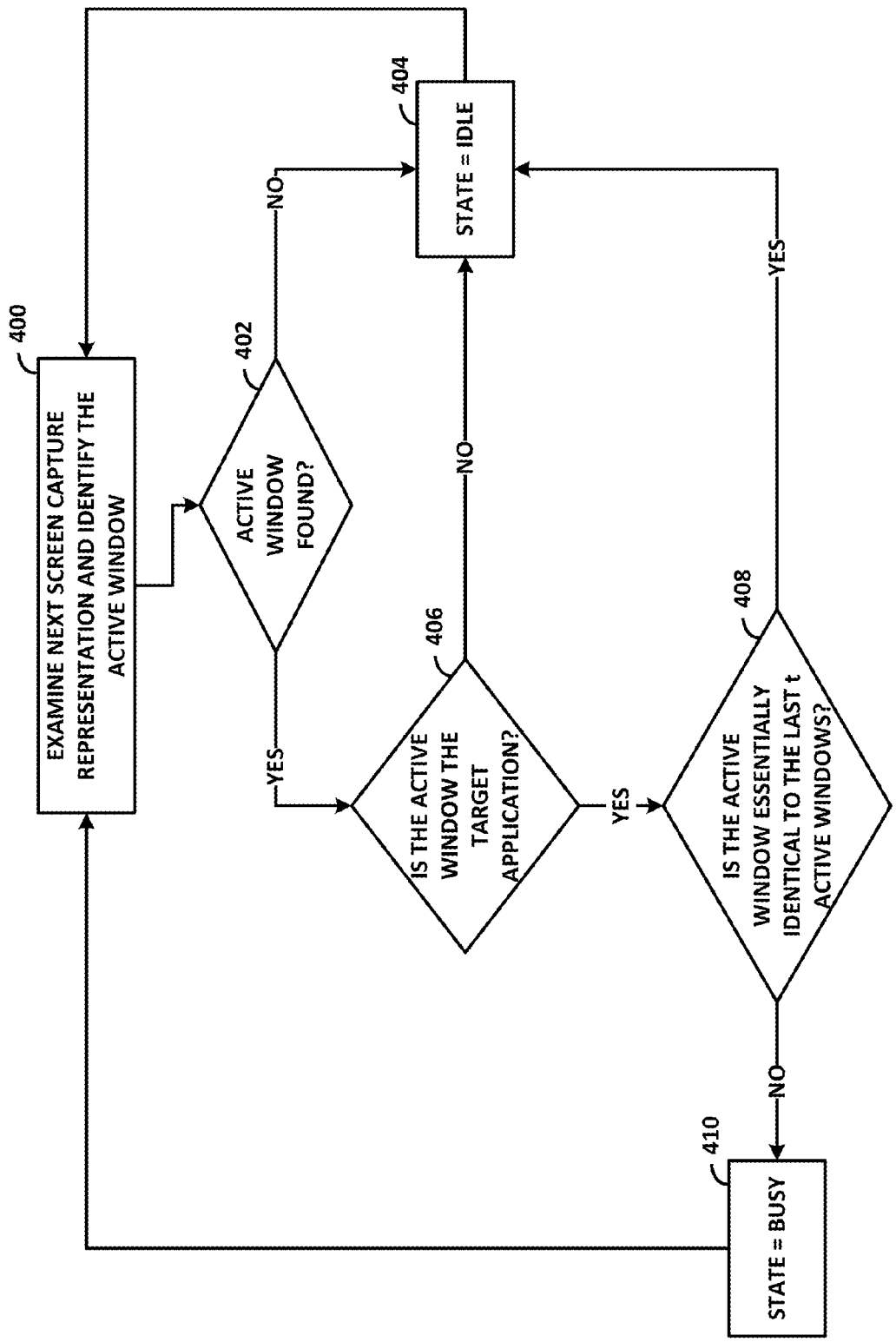
FIG. 4 is a flow chart, according to example embodiments.

FIG. 4 is a flow chart depicting an example embodiment for identifying busy and idle periods of a user of a supervised client device based on screen capture representations received from the client device. The flow chart of FIG. 4 may be used by server device 104 (or another device) either in real time (as screen capture representations are being received) or at a later point (after a set of screen capture representations have been received).

At block 400, server device 104 may examine the next screen capture representation in a series of screen capture representations. During this examination, server device 104 may attempt to identify an active window. At block 402, server device 104 may determine whether an active window has been found. If any active window has not been found, at block 404 the state of the user is determined to be idle.

There are various reasons why an active window might not be found in a screen capture representation of a graphical user interface. In some cases, the active window may be obscured by other windows on the graphical user interface. In other cases, the user may have locked the screen, closed all windows, or the user's client device may be operating a screen saver application. In any of these cases, the active window may be hidden or may not exist. Regardless of the cause, when an active window cannot be found, it is an indication that the user is idle.

If the active window is found, then at block 406, server device 104 may determine whether the active window is the target application. If this is not the case, then at block 404 the state of the user is determined to be idle. If this is the case, then at block 408, server device 104 may determine whether the active window is essentially identical to the last t active windows (e.g., the active windows in the previous t screen capture representations). If this is the case, then at block 404, the state of the user is determined to be idle. Otherwise, at block 410, the state of the user is determined to be busy. After the state of the user is determined, control is returned to block 400 so that the next screen capture representation can be examined.

Block 408 is a way for server device 104 to identify when a user leaves the active window open with the target application, but does not perform any substantive work. As noted above in the context of steps 326 and 328 of FIG. 3B, the user may be doing something other than working.

Use of the procedure illustrated in FIG. 4 may take place as follows. From the screen capture representations of blocks 302, 304, and 306, and 308, server device 104 can determine that the user of client device 102 was operating the target application at the times of screen captures 1, 2, and 3, but not at the time of screen capture 4. Therefore, server device 104 may conclude that the user was busy from approximately the time of screen capture 1 until approximately the time of screen capture 4.

From the screen capture representations of blocks 308, 310, and 312, server device 104 can determine that the user of client device 102 was not operating the target application at the times of screen captures 4 and 5, but was at the time of screen capture 6. Therefore, server device 104 may conclude that the user was idle from approximately the time of screen capture 4 until approximately the time of screen capture 6.

From the screen capture representations of blocks 312, 314, and 316, server device 104 can determine that the user of client device 102 was operating the target application at the times of screen captures 6 and 7, but not at the time of screen capture 8. Therefore, server device 104 may conclude that the user was busy from approximately the time of screen capture 6 until approximately the time of screen capture 8.

From the screen capture representations of blocks 316 and 318, server device 104 can determine that the user of client device 102 was not operating the target application at the time of screen capture 8, but was at the time of screen capture 9. Therefore, server device 104 may conclude that the user was idle from approximately the time of screen capture 8 until approximately the time of screen capture 9.

From the screen capture representations of blocks 318, 320, 322, 324, 326, 328, 330, and 332, server device 104 can determine that the user of client device 102 was operating the target application at the times of screen captures 9, 10, 11, 12, 13, 14, 15, and 16. However, server device 104 may be able to determine whether a particular active window is essentially identical to the last t active windows. For instance, server device 104 may be configured with an idle timer calibrated to a duration of t contiguous screen captures. Using the idle timer, server device 104 may conclude that a user has become idle after t contiguous screen captures that are essentially identical to one another.

If, as an example, t is 4, and server device 104 determines that screen captures 9, 10, 11, 12, 13, and 14 are essentially identical to one another while screen captures 15 and 16 are not, then server device 104 may conclude that the user was busy from approximately the time of screen capture 9 until approximately the time of screen capture 13, idle from approximately the time of screen capture 13 to approximately the time of screen capture 15, and then busy again from approximately the time of screen capture 15 to approximately the time of logout transaction 334.

The value of t may be selected based on the frequency at which client device 102 performs screen captures, as well as the task being performed by the user of client device 102. If t is too low, the user may be considered to be idle when he or she is reading or otherwise considering at item on the screen of client device 102. On the other hand, if t is too high, the user may be considered to be active when he or she is idle. For document review applications, reasonable values of t may equate to 15-45 seconds of time, though other values of t may be used instead.

With access to target application database 118 (most likely via an application programming interface (API)), screen capture processing module 114 may be able to obtain more busy/idle period information. For instance, assuming that target application database 118 provides timestamp information and its clock is synchronized with the rest of the world, this timestamp information can be used to enhance or verify the busy/idle periods determined by screen capture processing module 114. For instance, target application database 118 may provide information such as document length and time that the user spent reviewing each document. This information may be used to improve the accuracy of the determined busy/idle periods.

In FIG. 4, the operations of identifying the active window, determining whether the active window is the target application, and determining when the active window is essentially identical to the last t active windows may be accomplished in various ways. The following subsections provide example embodiments for each of these operations.

A. Identifying the Active Window

Figure 5A:
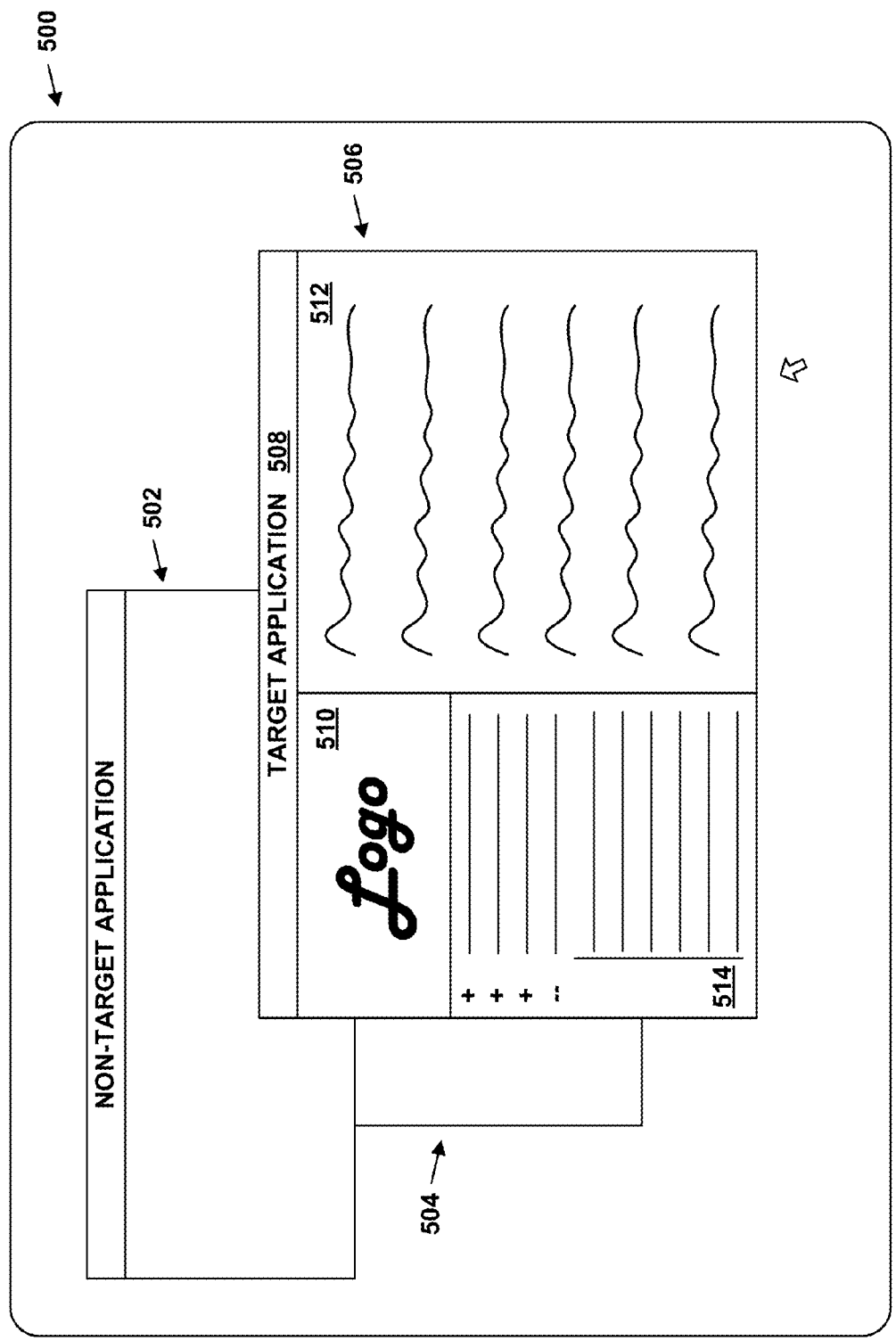
FIG. 5A depicts a screen capture representation, according to example embodiments.

FIG. 5A depicts an example screen capture representation 500 of the graphical user interface of client device 102. Screen capture representation 500 may include a non-target application operating in window 502, another non-target application operating in window 504, and the target application operating in window 506. Window 506 may be overlaid on top of window 502 and window 504, thereby indicating that window 506 is the active window.

Some client devices may support screen capture operations that capture just the active window. Thus, on these client devices, screen capture representations might include only the active window. For instance, on such a client device, screen capture representation 500 may consist of only window 506, and therefore the active window is readily identified.

However, other client devices might not support such a feature. Instead, these client devices may represent the entirety of a graphical user interface in each screen capture representation. It is desirable for server device 104 to be able to identify the active window from a screen capture representation such as screen capture representation 500.

One possible way of doing so is to slide rectangular outlines of varying sizes over the screen capture representation. When one of the rectangular outlines surrounds and/or adjoins all four borders of a rectangular shape in the screen capture representation, this rectangular shape may be determined to be the active window.

Figure 5B:
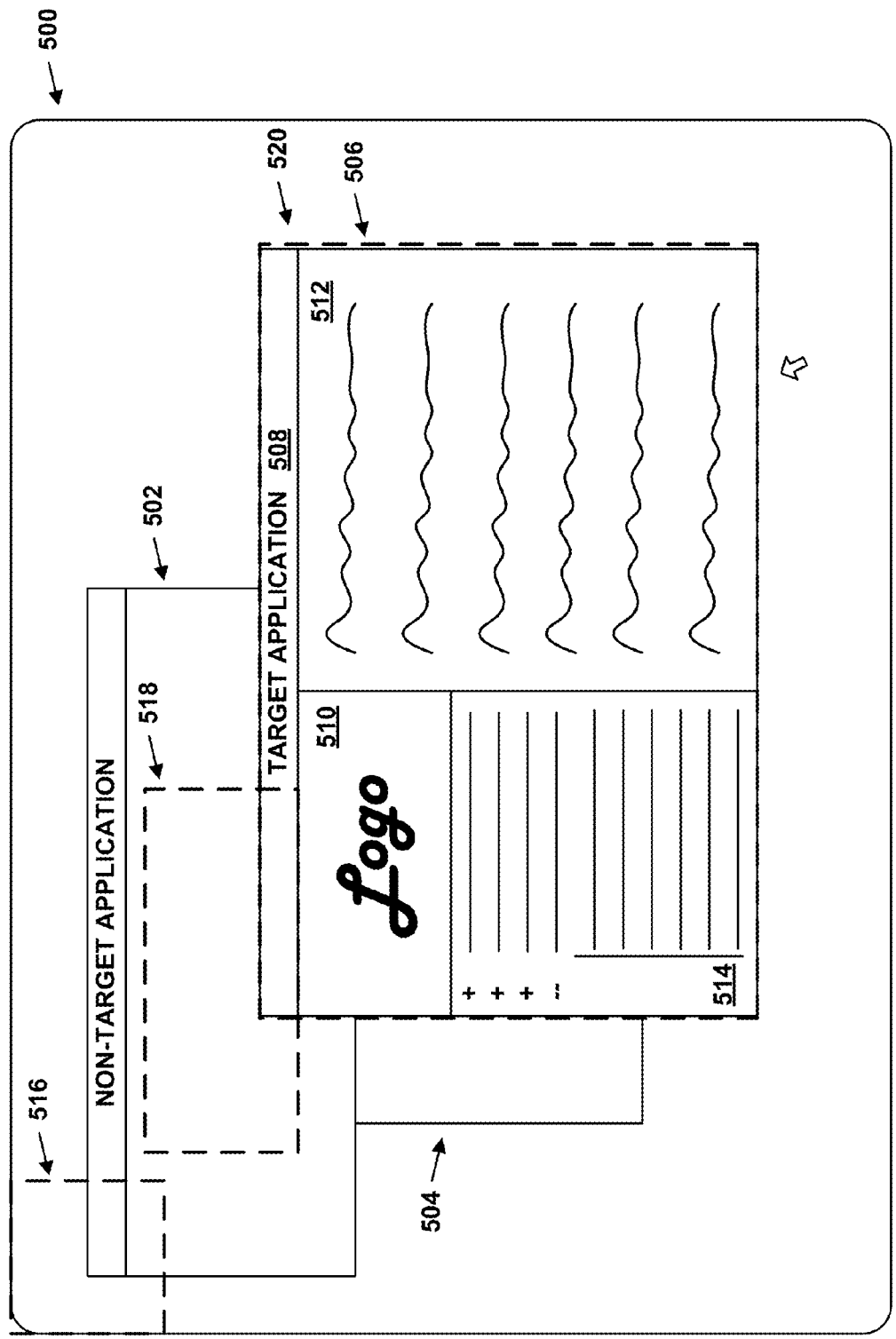
FIG. 5B depicts identifying an active window of a screen capture representation, according to example embodiments.

As an illustrative example, consider FIG. 5B. This figure depicts three rectangular outlines surrounding various parts of screen capture representation 500. Rectangular outline 516 and rectangular outline 518 do not surround or adjoin all four borders of a rectangular shape. However, rectangular outline 520 surrounds and adjoins the four borders of window 506. Consequently, window 506 may be identified as the active window.

In some embodiments, sliding rectangular outlines of varying sizes over the screen capture representation may involve selecting a nominally-sized small rectangular outline (e.g., 150×150 pixels) and sliding it horizontally over the screen capture representation at various vertical levels (e.g., 0 pixels from the top of the screen capture representation, 50 pixels from the top of the screen capture representation, 100 pixels from the top of the screen capture representation, etc.). If the active window is not found, then the same or a similar process may be repeated using a larger rectangular outline (e.g., 200×200 pixels). This technique may continue until the active window is identified or a rectangular outline the same size as the screen capture representation is used.

If this technique fails to identify an active window, the user may have cleared his or her screen, closed all windows, or a screen saver may be operating. As such, the user's state should be considered to be idle, per block 404.

B. Determining Whether the Active Window is the Target Application

Once the active window is determined, server device 104 may next determine whether the active window is the target application. One way of doing so is based on a title bar which is typically located at the top of a window.

For instance, window 506 includes title bar 508 containing the text string "target application". Server device 104 may perform optical character recognition on title bar 508 to derive this text string. From this text string, the application of window 506 may be identified, and server device 104 may further determine whether the identified application is the target application.

However, if the application of window 506 cannot be determined from the text string, or if window 506 does not include text in its title bar, server device 104 may consider other factors. For instance, if the target application displays a particular logo or graphical pattern in one or more locations, server device 104 may search the window 506 for this logo.

As an example, in FIG. 5A, window 506 contains a logo in area 510, located at the top left of this window. Server device 104 may compare a known logo used by the target application to area 510. If the known logo matches part of area 510 (e.g., the logo therein), then server device 104 may determine that window 506 is the target application.

Still, some target applications might not use logos or other types of identifying graphics or images, or server device 104 might not be able to find a logo in window 506. In these cases, server device 104 may consider the layout, color pattern, text size, graphical content, and perhaps other factors of window 506 as a whole. For instance, in addition to a logo in area 510, window 506 also contains a document (image, text or both) in area 512 and a menu in area 514.

In particular, server device 104 may encode a representation of the factors of window 506 as a vector. Server device 104 may also have access to a set of vectors each associated with a particular application. This set of vectors may be stored in activity database 116, for instance. Server device 104, may compare the vector associated with window 506 with one or more of the stored vectors, and determine the stored vector that is closest to the vector associated with window 506. Server device 104 may further determine that the application of window 506 is the application associated this closest stored vector. Various types of machine learning techniques may be employed to determine the closeness of the stored vectors to the vector associated with window 506.

C. Determining Whether Active Windows are Essentially Identical

A challenge in determining whether two or more active windows are essentially identical is that the active window may exhibit minor changes that are not indicative of user activity. For instance, the active window may include a clock that changes once per second or once per minute. Alternatively or additionally, if the active window contains a background image or animation, these items may change from time to time without user input. On the other hand, insubstantial user input, such as a mouse pointer moving or a few keys being pressed on a keyboard might not be indicative of the user actually working Thus, if two or more active windows remain mostly identical with very small differences, they may be considered essentially identical. As one possible embodiment, if more than a threshold percentage of the pixels on two active windows are identical, the active windows may be deemed to be essentially identical. This threshold percentage may be (but is not limited to) 80%, 90%, 95%, 98%, 99% etc. When making this determination, certain portions of the active window that are known to change without user input (e.g., an animation box) may be ignored.

5. Example Dashboard Interface

Figure 6:
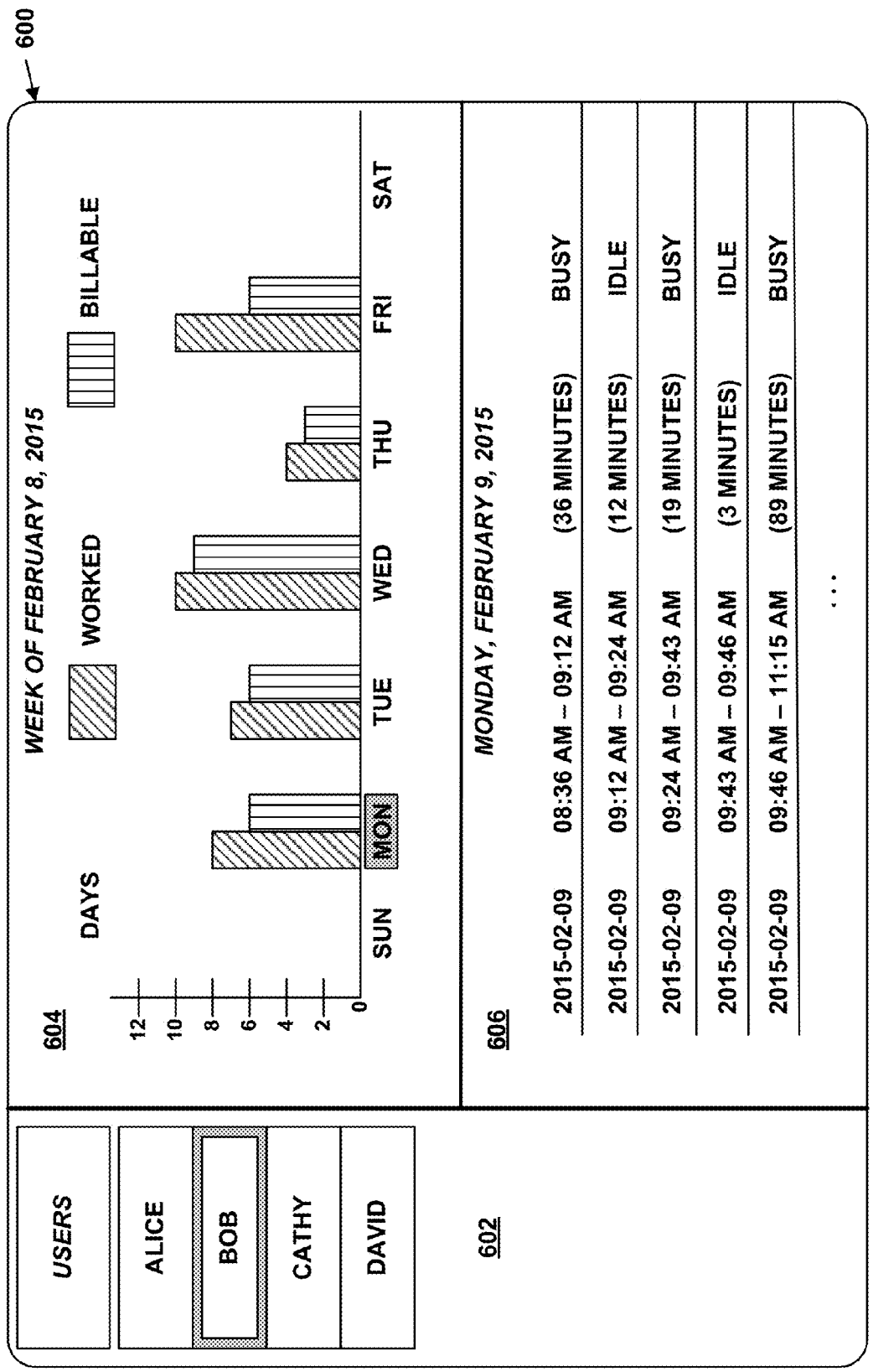
FIG. 6 depicts a dashboard interface, according to example embodiments.

FIG. 6 depicts an example dashboard interface 600. Dashboard interface 600 allows an administrator of the target application to visually inspect the busy and idle periods of one or more users of the target application. The information displayed in dashboard interface 600 may be derived from information stored in activity database 116 and/or target application database 118, for example.

Area 602 of dashboard interface 600 displays a list of selectable users. While the list shown in area 602 includes only four users, lists including many more users could be supported. In some cases, these users may be arranged by task, by their performance, or according to one or more other factors. FIG. 6 depicts the user "Bob" being selected.

Area 604 of dashboard interface 600 displays, for a particular week, a summary of the hours worked per day by the selected user. The week displayed may be the current week or the previous week, and other weeks may be selectable. As an example, for each day of the week, area 604 provides a bar chart showing the total number of hours the selected user worked (i.e., the sum of time in the user's busy periods and idle periods), as well as the total number of billable hours for the selected user (i.e., the sum of time in the user's busy periods only). As expected, the user's billable time per day is less than the user's total time worked per day. Area 604 also allows a day of the displayed week to be selected. In FIG. 6, Monday ("MON") is selected.

Area 606 of dashboard interface 600 displays the selected user's busy and idle periods for the selected day. For purposes of simplicity, area 606 only shows a total of five busy/idle periods, but a dashboard interface arranged in accordance with the embodiments herein might display more busy/idle periods (e.g., using a scroll bar). Area 606 demonstrates that the selected user was logged in to the target application for 159 minutes between 8:36 am and 11:15 am on Monday, Feb. 9, 2015, but was idle for 20 of those minutes. Thus, the user's billable time for this epoch is 139 minutes.

In some embodiments, the individual busy and/or idle periods displayed in area 606 may be further associated with the screen capture representations from those respective time periods. As an example, dashboard interface 600 may allow each time period to be selected, and in response may display a list of the associated screen capture representations. Each of these screen capture representations may be viewable. In this way, the efficacy of the remote supervision procedures can be verified. For instance, if a user disputes the determined number of billable hours for a particular time period, the screen capture representations from this time period may be retrieved for examination.

FIG. 6 depicts just one possible dashboard interface. Other types of interfaces may be possible, and these other interfaces may contain different information arranged in a different fashion. Some dashboard interfaces may be user-facing, in that they provide information tailored to the user of a client device, whereas other dashboard interfaces may be administrator-facing, in that they provide information tailored to the administrator of a server device and/or the target application.

6. Example Operations

Figure 7:
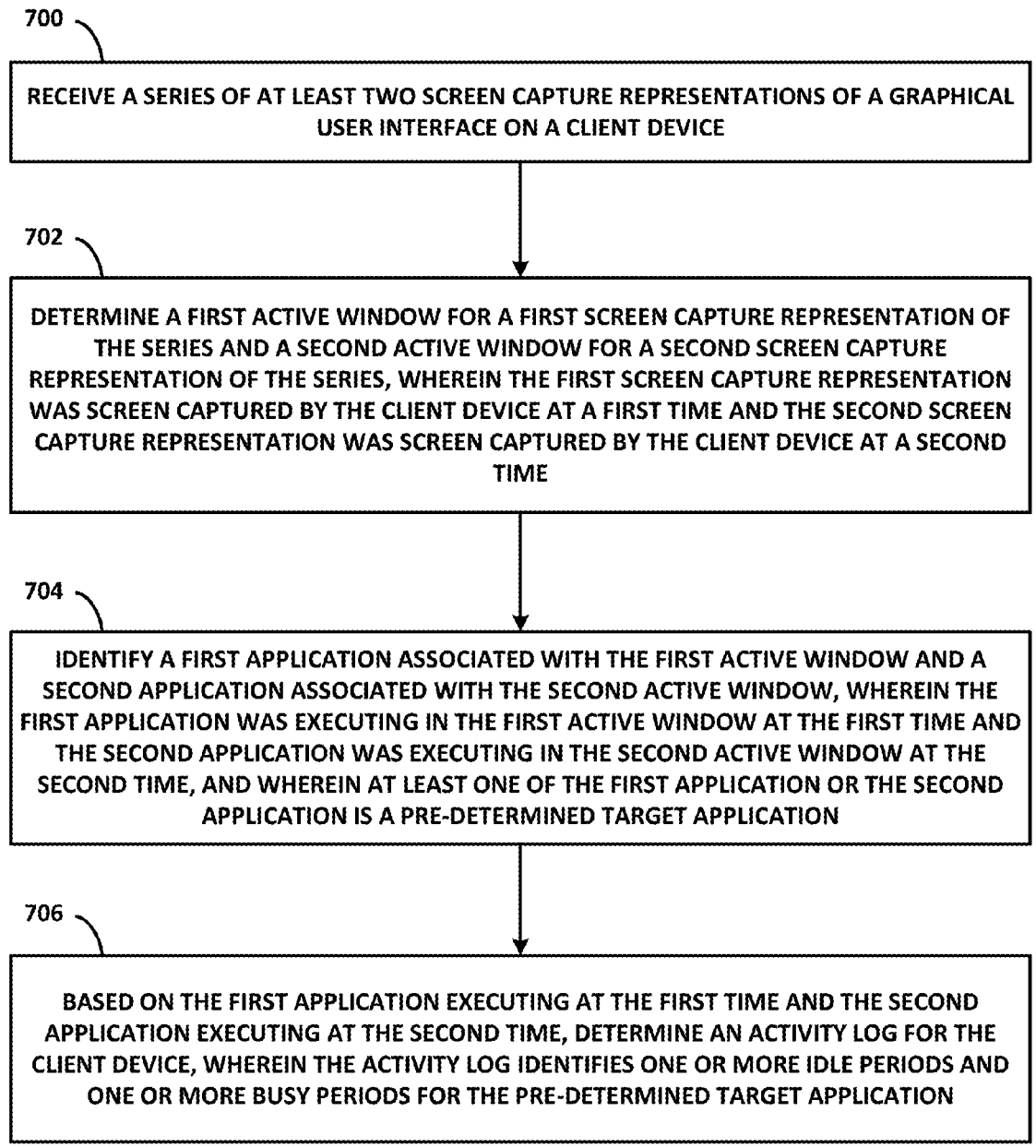
FIG. 7 is another flow chart, according to example embodiments.

FIG. 7 is a flow chart illustrating example embodiments. The embodiments illustrated by FIG. 7 may be carried out by a computing device, such as server device 104. However, the embodiments can be carried out by other types of devices or device subsystems. Further, the embodiments may be combined with one another and may incorporate any aspect or feature disclosed in this specification or the accompanying drawings.

Block 700 of FIG. 7 may involve receiving a series of at least two screen capture representations of a graphical user interface on a client device. Block 702 may involve determining a first active window for a first screen capture representation of the series and a second active window for a second screen capture representation of the series. The first screen capture representation may have been screen captured by the client device at a first time and the second screen capture representation may have been screen captured by the client device at a second time.

Block 704 may involve identifying a first application associated with the first active window and a second application associated with the second active window. The first application may have been executing in the first active window at the first time and the second application may have been executing in the second active window at the second time. At least one of the first application or the second application may be a pre-determined target application.

Block 706 may involve, possibly based on the first application executing at the first time and the second application executing at the second time, determining an activity log for the client device, wherein the activity log identifies one or more idle periods and one or more busy periods for the pre-determined target application.

In some embodiments, the first screen capture representation may consist of the first active window and the second screen capture representation may consist of the second active window. In other embodiments, the first screen capture representation may include more than the first active window, and determining the first active window includes (i) sliding rectangular outlines of varying sizes over the first screen capture representation, (ii) identifying when one of the rectangular outlines surrounds four borders of a rectangular shape in the first screen capture representation, and (iii) determining that the rectangular shape is the first active window.

In some embodiments, identifying the first application associated with the first active window may involve performing character recognition on text in a title bar of the first active window. The recognized characters may identify the first application. Alternatively or additionally, identifying the first application associated with the first active window may involve recognizing a logo within the first active window. The recognized logo may identify the first application. Alternatively or additionally, identifying the first application associated with the first active window may involve (i) classifying characteristics of the first active window into a vector, (ii) comparing the vector to a database of vectors, wherein vectors in the database represent characteristics of particular applications, and (iii) possibly based on the comparison, selecting one of the particular applications as the first application. The characteristics of the first active window may include text and color patterns within the active window, and the characteristics of particular applications may include text and color patterns of the particular applications.

In some embodiments, a user of the client device may be associated with a reliability factor. A frequency at which the client device performs the screen captures may be inversely proportional to the reliability factor.

In some embodiments, determining the activity log for the client device may involve (i) determining that the first screen capture representation begins a contiguous subset of the screen capture representations, each containing respective active windows identified as the pre-determined target application, (ii) determining that the second screen capture representation ends the contiguous subset of the screen capture representations, and (iii) identifying, in the activity log, from the first time to the second time as a busy period.

In some embodiments, an idle timer may be calibrated to a duration of t contiguous screen captures. Determining the activity log for the client device may involve (i) determining that an ith screen capture representation begins a contiguous subset of m essentially identical screen capture representations, each containing respective active windows identified as the pre-determined target application, (ii) determining that a (i+m)th screen capture representation ends the contiguous subset of the screen capture representations, where m is greater than t, (iii) identifying, in the activity log, a duration of the ith screen capture representation through the (i+t)th screen capture representation as a busy period, and (iv) identifying, in the activity log, a duration of the (i+t)th screen capture representation to the (i+m)th screen capture representation as an idle period.

In some embodiments, determining the activity log for the client device may involve (i) determining that the first screen capture representation begins a contiguous subset of the screen capture representations, none containing respective active windows identified as being the pre-determined target application, (ii) determining that the second screen capture representation ends the contiguous subset of the screen capture representations, and (iii) identifying, in the activity log, from the first time to the second time as an idle period.

In some embodiments, the server device may, based on the activity log, determine a first total time that a user of the client device used the client device and a second total time that the user actively used the pre-determined target application on the client device. The first total time may include idle and busy periods, and the second total time may include only busy periods, where the first total time is greater than the second total time.

7. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

receiving, by a server device, a series of at least two screen capture representations of a graphical user interface on a client device, wherein an amount of idle time has been recorded for a user of the client device, and wherein a frequency at which the client device performs the screen captures is proportional to the amount of idle time;

determining a first active window for a first screen capture representation of the series and a second active window for a second screen capture representation of the series, wherein the first screen capture representation was screen captured by the client device at a first time and the second screen capture representation was screen captured by the client device at a second time;

identifying a first application associated with the first active window and a second application associated with the second active window, wherein the first application was executing in the first active window at the first time and the second application was executing in the second active window at the second time, and wherein at least one of the first application or the second application is a pre-determined target application; and based on the first application executing at the first time and the second application executing at the second time, determining, by the server device, an activity log for the client device, wherein the activity log identifies one or more idle periods and one or more busy periods for the pre-determined target application, wherein determining the activity log for the client device comprises: (i) determining that the series of screen captures includes a contiguous subset of essentially identical screen capture representations exceeding a particular number, each of the subset containing respective active windows identified as the pre-determined target application, (ii) identifying, in the activity log, a duration of the particular number of contiguous screen captures at a beginning of the subset as a busy period, and (iii)

identifying, in the activity log, a duration of contiguous screen captures in the subset that follow the particular number of contiguous screen captures as an idle period.

2. The method of claim 1, wherein the first screen capture representation consists of the first active window and the second screen capture representation consists of the second active window.

3. The method of claim 1, wherein the first screen capture representation comprises more than the first active window, and wherein determining the first active window comprises:
    sliding rectangular outlines of varying sizes over the first screen capture representation;
    identifying when one of the rectangular outlines surrounds four borders of a rectangular shape in the first screen capture representation; and
    determining that the rectangular shape is the first active window.

4. The method of claim 1, wherein identifying the first application associated with the first active window comprises performing character recognition on text in a title bar of the first active window, wherein the recognized characters identify the first application.

5. The method of claim 1, wherein identifying the first application associated with the first active window comprises recognizing a logo within the first active window, wherein the recognized logo identifies the first application.

6. The method of claim 1, wherein identifying the first application associated with the first active window comprises:
    classifying characteristics of the first active window into a vector;
    comparing the vector to a database of vectors, wherein vectors in the database represent characteristics of particular applications; and
    based on the comparison, selecting one of the particular applications as the first application.

7. The method of claim 6, wherein the characteristics of the first active window include text and color patterns within the active window, and wherein the characteristics of particular applications include text and color patterns of the particular applications.

8. The method of claim 1, wherein determining the activity log for the client device comprises:
    determining that the first screen capture representation begins a contiguous subset of the screen capture representations, the screen capture representations in the subset containing respective active windows identified as the pre-determined target application;
    determining that the second screen capture representation ends the contiguous subset of the screen capture representations; and
    identifying, in the activity log, from the first time to the second time as a busy period.

9. The method of claim 1, wherein determining the activity log for the client device comprises:
    determining that the first screen capture representation begins a contiguous subset of the screen capture representations, none of the screen capture representations in the subset containing respective active windows identified as being the pre-determined target application;
    determining that the second screen capture representation ends the contiguous subset of the screen capture representations; and
    identifying, in the activity log, from the first time to the second time as an idle period.

10. The method of claim 1, further comprising:
    based on the activity log, determining a first total time that a user of the client device used the client device and a second total time that the user actively used the pre-determined target application on the client device, wherein the first total time includes idle and busy periods, wherein the second total time includes only busy periods, and wherein the first total time is greater than the second total time.

11. An article of manufacture including a non-transitory computer-readable medium, having stored thereon program instructions that, upon execution by a computing device, cause the computing device to perform operations comprising:
    receiving a series of at least two screen capture representations of a graphical user interface on a client device, wherein an amount of idle time has been recorded for a user of the client device, and wherein a frequency at which the client device performs the screen captures is proportional to the amount of idle time;
    determining a first active window for a first screen capture representation of the series and a second active window for a second screen capture representation of the series, wherein the first screen capture representation was screen captured by the client device at a first time and the second screen capture representation was screen captured by the client device at a second time;
    identifying a first application associated with the first active window and a second application associated with the second active window, wherein the first application was executing in the first active window at the first time and the second application was executing in the second active window at the second time, and wherein at least one of the first application or the second application is a pre-determined target application; and
    based on the first application executing at the first time and the second application executing at the second time, determining an activity log for the client device, wherein the activity log identifies one or more idle periods and one or more busy periods for the pre-determined target application, wherein determining the activity log for the client device comprises: (i) determining that the series of screen captures includes a contiguous subset of essentially identical screen capture representations exceeding a particular number, each of the subset containing respective active windows identified as the pre-determined target application, (ii) identifying, in the activity log, a duration of the particular number of contiguous screen captures at a beginning of the subset as a busy period, and (iii) identifying, in the activity log, a duration of contiguous screen captures in the subset that follow the particular number of contiguous screen captures as an idle period.

12. The article of manufacture of claim 11, wherein the first screen capture representation comprises more than the first active window, and wherein determining the first active window comprises:
    sliding rectangular outlines of varying sizes over the first screen capture representation;
    identifying when one of the rectangular outlines surrounds four borders of a rectangular shape in the first screen capture representation; and
    determining that the rectangular shape is the first active window.

13. The article of manufacture of claim 11, wherein identifying the first application associated with the first active window comprises performing character recognition on text in a title bar of the first active window, wherein the recognized characters identify the first application.

14. The article of manufacture of claim 11, wherein identifying the first application associated with the first active window comprises recognizing a logo within the first active window, wherein the recognized logo identifies the first application.

15. The article of manufacture of claim 11, wherein identifying the first application associated with the first active window comprises:
- classifying characteristics of the first active window into a vector;
- comparing the vector to a database of vectors, wherein vectors in the database represent characteristics of particular applications; and
- based on the comparison, selecting one of the particular applications as the first application.

16. A computing device comprising:
- at least one processor;
- memory; and
- program instructions, stored in the memory, that upon execution by the at least one processor cause the computing device to perform operations comprising:
- receiving a series of at least two screen capture representations of a graphical user interface on a client device, wherein an amount of idle time has been recorded for a user of the client device, and wherein a frequency at which the client device performs the screen captures is proportional to the amount of idle time;
- determining a first active window for a first screen capture representation of the series and a second active window for a second screen capture representation of the series, wherein the first screen capture representation was screen captured by the client device at a first time and the second screen capture representation was screen captured by the client device at a second time;
- identifying a first application associated with the first active window and a second application associated with the second active window, wherein the first application was executing in the first active window at the first time and the second application was executing in the second active window at the second time, and wherein at least one of the first application or the second application is a pre-determined target application; and
- based on the first application executing at the first time and the second application executing at the second time, determining an activity log for the client device, wherein the activity log identifies one or more idle periods and one or more busy periods for the pre-determined target application, wherein determining the activity loq for the client device comprises: (i) determining that the series of screen captures includes a contiguous subset of essentially identical screen capture representations exceeding a particular number, each of the subset containing respective active windows identified as the pre-determined target application, (ii) identifying, in the activity loq, a duration of the particular number of contiguous screen captures at a beginning of the subset as a busy period, and (iii) identifying, in the activity log, a duration of contiguous screen captures in the subset that follow the particular number of contiguous screen captures as an idle period.

17. The computing device of claim 16, wherein the first screen capture representation comprises more than the first active window, and wherein determining the first active window comprises:
- sliding rectangular outlines of varying sizes over the first screen capture representation;
- identifying when one of the rectangular outlines surrounds four borders of a rectangular shape in the first screen capture representation; and
- determining that the rectangular shape is the first active window.

18. The computing device of claim 16, wherein identifying the first application associated with the first active window comprises performing character recognition on text in a title bar of the first active window, wherein the recognized characters identify the first application.

19. The computing device of claim 16, wherein identifying the first application associated with the first active window comprises recognizing a logo within the first active window, wherein the recognized logo identifies the first application.

20. The computing device of claim 16, wherein identifying the first application associated with the first active window comprises:
- classifying characteristics of the first active window into a vector;
- comparing the vector to a database of vectors, wherein vectors in the database represent characteristics of particular applications; and
- based on the comparison, selecting one of the particular applications as the first application.

* * * * *